(12) United States Patent
Zieger

(10) Patent No.: US 8,452,671 B2
(45) Date of Patent: May 28, 2013

(54) LOAD BUILDER

(75) Inventor: Martin C. Zieger, Mountain View, CA (US)

(73) Assignee: SAP Aktiengesellschaft, Walldorf (DE)

( * ) Notice: Subject to any disclaimer, the term of this patent is extended or adjusted under 35 U.S.C. 154(b) by 2852 days.

(21) Appl. No.: 10/676,401

(22) Filed: Oct. 1, 2003

(65) Prior Publication Data

US 2005/0075951 A1    Apr. 7, 2005

(51) Int. Cl.
*G06Q 10/00* (2006.01)

(52) U.S. Cl.
USPC .............................. 705/28; 705/1.1

(58) Field of Classification Search
None
See application file for complete search history.

(56) References Cited

U.S. PATENT DOCUMENTS

| | | | | |
|---|---|---|---|---|
| 3,970,832 | A * | 7/1976 | Itschner | 702/136 |
| 6,321,363 | B1 * | 11/2001 | Huang et al. | 716/106 |
| 6,876,958 | B1 * | 4/2005 | Chowdhury et al. | 703/7 |
| 6,937,992 | B1 * | 8/2005 | Benda et al. | 705/7 |
| 7,085,687 | B2 * | 8/2006 | Eckenwiler et al. | 703/1 |
| 2002/0069210 | A1 * | 6/2002 | Navani et al. | 707/104.1 |
| 2003/0014286 | A1 * | 1/2003 | Cappellini | 705/5 |

OTHER PUBLICATIONS

Arghavani et al. "3D Volumetric Pallet-Loading Optimisation" The International Journel of Advanced Manufacturing Technology, 1996.*

* cited by examiner

*Primary Examiner* — Asfand Sheikh
(74) *Attorney, Agent, or Firm* — Blakely Sokoloff Taylor & Zafman, LLP

(57) ABSTRACT

Embodiments of the invention include a system for simulating the loading of a shipment of a set of products. The shipment may be loaded into a set of transports. The simulation may include attempts to fill each transport. The simulation may include evaluating a set of constraints on the shipment. The constraints may include a complex logical statement.

15 Claims, 5 Drawing Sheets

LOAD BUILDER

BACKGROUND

1. Field of the Invention

The invention relates to supply chain management. Specifically, the invention relates to building loads for transports to fulfill the demand of target locations.

2. Background

A supply chain is a network of retailers, distributors, transporters, warehouses, and suppliers that take part in the production, delivery and sale of a product or service. Supply chain management is the process of coordinating the movement of the product or service, information related to the product or service, and money among the constituent parts of a supply chain. Supply chain management also integrates and manages key processes along the supply chain. Supply chain management strategies often involve the use of software in order to project and fulfill demand and improve production levels.

Logistics is a subset of the activities involved in supply chain management. Logistics includes the planning, implementation and control of the movement and storage of goods, services or related information. Logistics aims to create an effective and efficient flow and storage of goods, services and related information from a source to the target location where the product or source is to be shipped in order to meet the demands of a customer.

The movement of goods and services through a supply chain often involves the shipment of the goods and services between the source location at which the product is produced or stored and the target location where the product is to be shipped such as the wholesaler, vendor or retailer. The shipment of products involves a transport such as a truck, ship or airplane and involves the planning of the arrangement of the products to be shipped in the transport. The source location from which a set of products is shipped on a transport is selected based on the availability of the products at the source location.

The shipment of goods may involve complex constraints on the shipping of goods. Supply chain management systems are unable to simulate the loading of a transport while ensuring adherence to a complex set of constraints. Supply chain management systems are unable to maximize use of loaded transports.

SUMMARY

Embodiments of the invention include a system for simulating the loading of a shipment of a set of products onto a set of transports. The simulations may include attempts to fill each transport. The simulation may include evaluating a set of constraints on the shipment. The constraints may include a complex logical statement.

BRIEF DESCRIPTION OF THE DRAWINGS

Embodiments of the invention are illustrated by way of example and not by way of limitation in the figures of the accompanying drawings in which like references indicate similar elements. It should be noted that different references to "an" or "one" embodiment in this disclosure are not necessarily to the same embodiment, and such references mean at least one.

DETAILED DESCRIPTION

Figure 1:
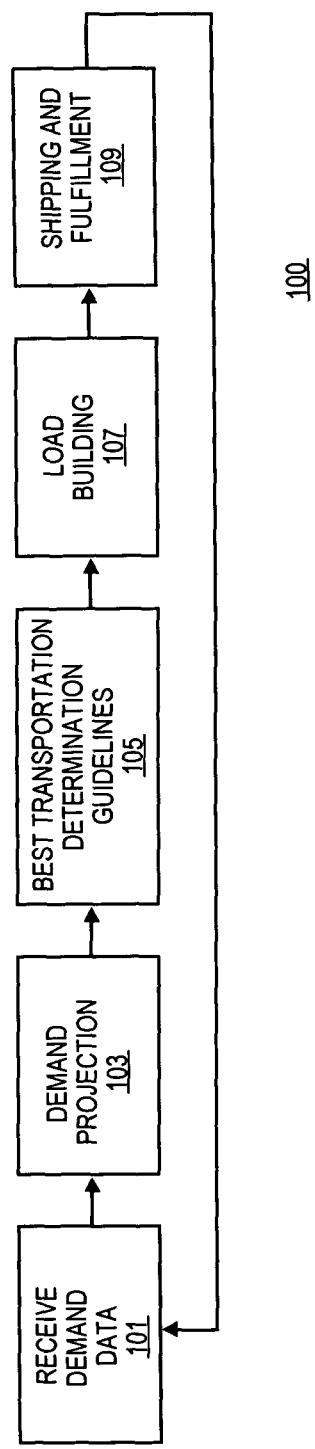
FIG. 1 is a diagram of a load building system.

FIG. 1 is a diagram of an order replenishment management system. Order replenishment system 100 may be utilized in a supply chain to manage the movement of goods between source locations and target locations. A source location may be any location in a supply chain that may provide a product or similar items. A target location may be any location in a supply chain that may receive a product or similar items. A single location may be both a source and target location dependent upon the context. For example a factory may be a source location that ships products to a warehouse or similar location. The same factory may be a target location for receiving component parts for a product assembled at the factory. Similarly, other locations including warehouses, distribution centers, retailers and similar locations may be either a source or target location dependent on the shipping context. The embodiments discussed herein primarily use an example where a factory or warehouse is the source location and the end user or retailer is the target location for sake of clarity. One skilled in the art would understand these are examples of target and source locations for an exemplary context.

In one embodiment, an order replenishment management system 100 may receive sales data, inventory data from retailers, inventory data from warehouses or similar demand data. Order replenishment management system 100 may then generate orders for shipments of products from source locations like factories and distribution centers to meet the demand generated by customers or end users. In one embodiment, order replenishment management system 100 receives sales, inventory or similar demand data from a set of retailers, warehouses and similar sources (block 101). The demand data may be received at regular intervals (e.g., days, months and similar time intervals).

The demand data that is received from the retailers, warehouses and similar sources is processed to predict the future demand for a set of products (block 103). As used herein the term "set" may include any number of items including a single item. The projected demand for a set of products may be for any time period (e.g., a month, week, day, hour or similar measurement of time). The projected demand may also include a prediction of demand for subdivisions of the time period of the projection. For example, a projection of demand for a month may have a breakdown of that demand on a day by day or week by week basis.

The projected demand data may be used to determine the best manner of transporting a set of products to a target location (block 105). The determination of a route for sending products to the target location may involve the analysis of the availability of demand products at various source locations, the cost of shipping the products from the source locations to the target locations and the utilization of the capacity of a transport for shipping the products from the source location to the target location.

The determination of the best transportation route relies on a simulation of building a load (e.g., a shipment of products) in a transport (block 107). The building of a load may involve consideration of the size, weight, product types and similar characteristics of a shipment. The loading of the shipment into a transport may be required to meet a set of constraints. For example, the transport may have a weight limit and a volume limit, certain products may not be properly shipped in the same transport as other products and similar shipping constraints may be a part of the loading simulation.

After the best transportation guidelines for shipping the products is determined, fulfillment instructions may be sent out to the origination site (block 109). The shipping and fulfillment instructions may be sent electronically to the source location. In one embodiment, the loading simulation and best transportation guidelines are determined at a central server node. The shipping and fulfillment instructions may be sent to a remote node at the source location through a network or similar communication system.

Figure 2:
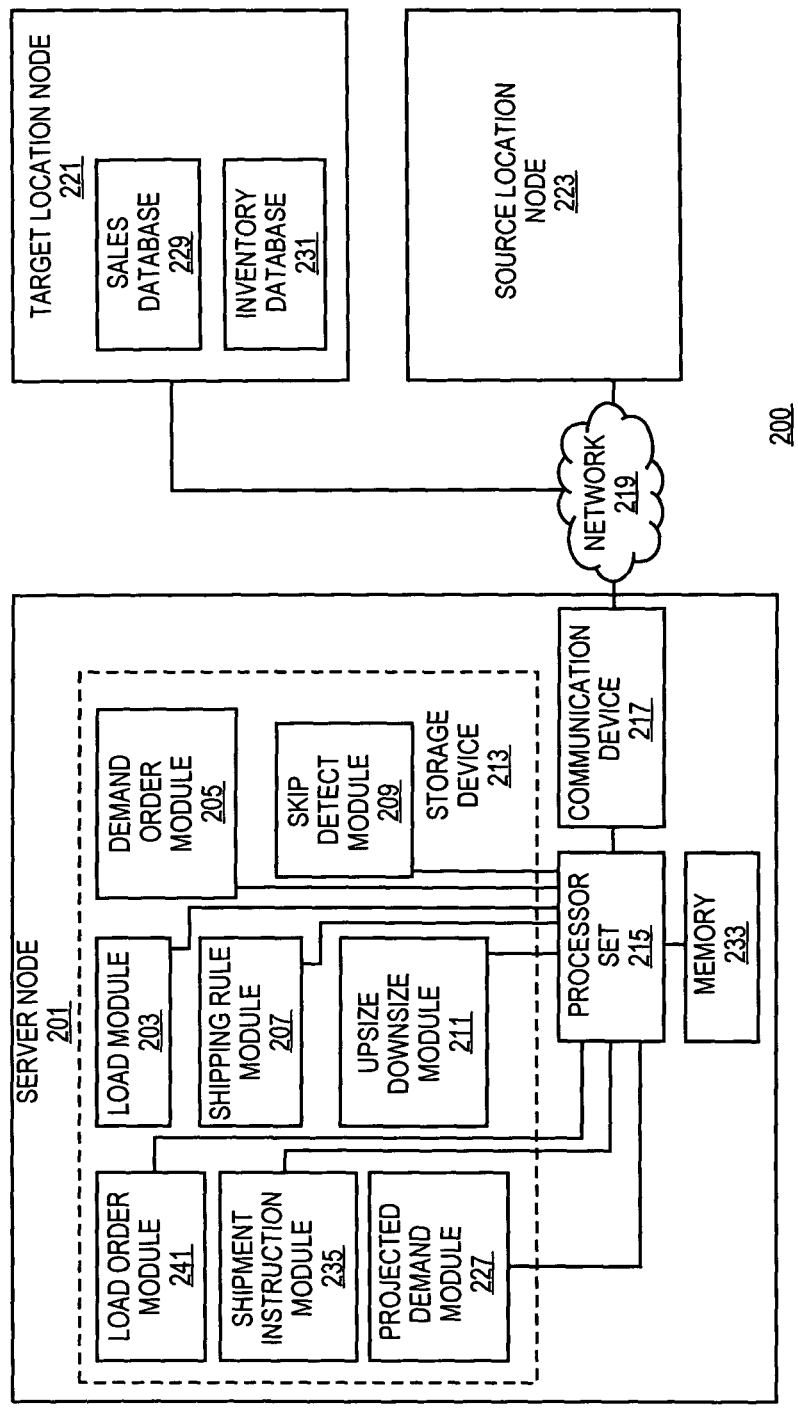
FIG. 2 is a diagram of a distributed load building system.

FIG. 2 is a diagram of a load building system. In one embodiment, load building system 200 may include a server node 201, target location node 221 and source location node 223. Server node 201 may be a single central server, a set of servers sharing the load building tasks or similar system. The load building system 200 may include multiple target location nodes 221 or multiple source location nodes 223. In one embodiment, target location node 221 may include a sales database 229 that tracks the sales of a retailer, vendor, warehouse or similar source of demand. The demand is fulfilled by a source location, such as a manufacturer or distributor of a set of products managed by the load building system 200. In another embodiment, target location node 221 may include an inventory database 231 that tracks the inventory levels of the products supplied by the load building system 200. Target location node 221 may be in communication with server node 201 through a network 219, point to point link or similar communication systems.

In one embodiment, server node 201 may include a communication device 217 to receive demand data including sales data or inventor data from the target location node 221 through network 219 or similar communications system. Communication device 217 may be a modem, network card or similar communications device. In one embodiment, the incoming sales and inventory data may be processed by a demand projection module 227. Demand projection module 227 may utilize the data supplied by target location node 221 to generate a set of demand orders that may be stored in a demand order module 205. In one embodiment, incoming demand data may include varying types of data, such as demand related to special promotions, demand for common product restocking or similar data. Projected demand module 227 or similar module may adjust, filter or sort data according to type to prevent skewed demand orders or generate demand orders for a specific type of product demand. In one embodiment, demand order module 205 may be a data structure that stores and tracks a set of products for which demand has been predicted by projected demand module 227. For example, projected demand module 227 may determine that one hundred units of a product should be shipped to a destination (e.g., a retailer, warehouse or similar destination) each week and that fifty of the product units should be shipped on a Monday and ten units should be shipped Tuesday through Saturday in order to meet the projected demand.

In one embodiment, load module 203 may be an application that simulates the loading of a set of transports with a shipment of products based demand data from a demand order module. For example, a load module 203 may be used to determine how the fifty units of the Monday shipment will be loaded onto a set of transports. In one embodiment, load module 203 may work in connection with shipping rule module 207 when simulating the loading of the set of transports. Shipping rule module 207 may be a data structure that includes a set of shipping rules or constraints on the shipping of products using a set of transports. Shipping constraints may include limitations on the combinations of certain products in a single transport, weight limitations of a transport, size of a transport, default shipment configurations and similar data.

In one embodiment, load module 203 may attempt to create "full" loads by maximizing the utilization of the capacity of a set of transports used for shipping. Maximizing the utilization of a set of transports can reduce the per item or unit shipping costs. Maximum utilization may be measured in any appropriate manner such as the number of shipping units that a transport may carry, the weight limit a transport may carry, the volume of goods that a transport may carry or by use of similar criteria. Maximum utilization may mean that the carrying capacity is used to its fullest extent (e.g., it has met its weight limit or its volume limit or shipping limit) or falls within an acceptable range (e.g., +1000 pounds of the transports weight limit). This range may be defined to suit the needs of the order replenishment system or user. The range of acceptable "full" loads may be characterized as having a maximum bound and minimum bound.

In one embodiment, the load module 203 may not fill all of the transports up to a maximum bound of a valid load configuration range. In one embodiment, the maximum bound may be a default loading goal. Load module 203 may load some of the transports only up to a minimum bound in order to obtain a last shipment that meets a minimum bound of a valid load configuration range. The number of transports which are filled up to the minimum bound may be kept at a minimum. If this approach does not lead to a solution, the upsize downsize module 211 may be triggered.

In one embodiment, an upsize downsize module 211 may be used in connection with the simulation of the load by the load module 203. Upsize downsize module 211 may alter the size of a shipment to maximize the usage of a transport. In one embodiment, the upsize downsize module 203 alters the size of a shipment to fill a transport to its maximum capacity. The maximum capacity of a transport may vary dependent on the shipping unit size, variance in the weight of shipping units and similar considerations. The complete utilization of a transport may be a shipment that utilizes a space, weight, or shipping unit number that falls within a defined range that approximates the maximum usage of the transport for the given measurement. For example, a transport may be able to carry 70 units of a product. The demand order for Monday is 50 units. Thus, the transport has additional space for 20 units on the Monday shipment. Upsizing downsizing module 211 increases the size of the shipment to include the Tuesday shipment of 10 units and the Wednesday shipment of 10 units. The transport is then full having been loaded with 70 units. In another example, a transport may be able to carry 40 units of a product. Upsizing downsizing module 211 decreases the Monday shipment to 40 units.

In one embodiment, a skip detection module 209 may work with load module 203 to detect a scenario in the load simulation where a range of a constraint is entirely skipped over during the incremental loading of a transport. If a range of a constraint is entirely skipped over during the simulation then the loading of the transport with the shipment in a manner that satisfies the constraint may not be possible because the shipping unit size is too large to find a configuration that falls within the range of the constraint. Skip detection module 209 may trigger the removal of all shipping units from a simulated load after the detection of the skipping. The last unit of the product type which lead to the skipping may be changed. The remainder of the shipment may then be loaded using the same process as before. For example, if a shipping unit has a weight of 1000 pounds and a constraint is imposed on the shipment that it have a total weight of 2500 to 2800 pounds, then if two shipping units are loaded the total weight is 2000 pounds, but if three shipping units are loaded the total weight is 3000 pounds making it impossible to meet the required constraints. Skip detection module 209 detects the skip when the third unit is loaded. Skip detection module 209 may backtrack the simulation to the last valid configuration. For example, skip detection module 209 may backtrack to two units and load module may attempt to load other product types.

When the desired load configuration has been determined by the load module 203 the results may be sent to a shipment instruction module 225. Shipment instruction module 225 may generate a formatted set of loading configurations or instructions. Shipment instruction module 225 may then output the loading configurations and instructions in the form of a load order module 241 or similar format to source location node 223. In one embodiment, the load configuration instructions may be saved in the form of a load order module 241. This module may be a formatted file or data structure. The shipment instructions may be sent through a communication device 217 over a network 219 or similar communications system. Source location node 217 may be located at a source location such as a factory, warehouse or similar product source location.

In one embodiment, the modules of load building system 200 are a set of software instructions, data structures, electronic devices or similar implementations. In one embodiment, the data structures and instructions may be constructed using an object oriented paradigm or similar implementation. In one embodiment, the instructions and data structures are stored on a storage device 213. The instructions may be executed or the data structures loaded by a set of processors 215. The set of processors may utilize a system memory 233.

Figure 3:
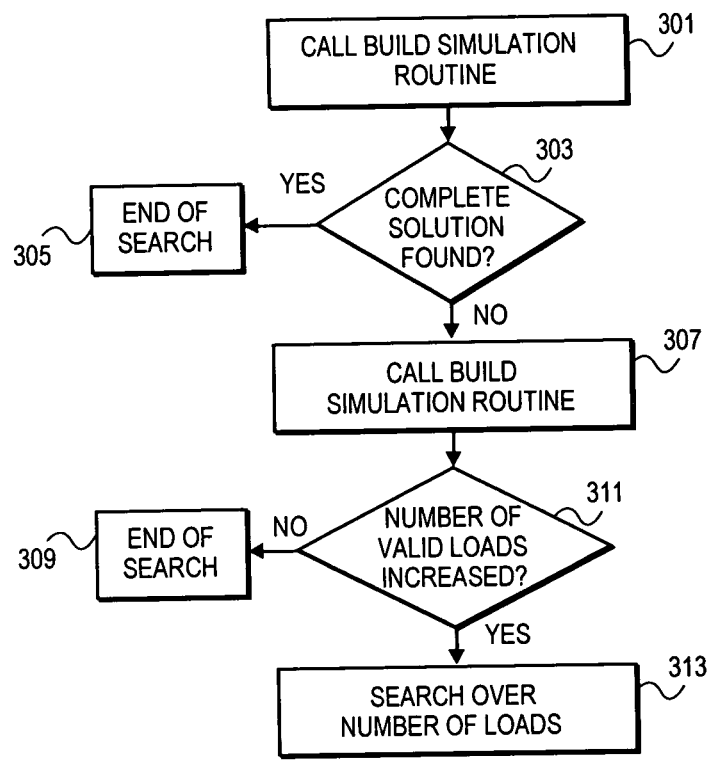
FIG. 3 is a flowchart of a load building system.

FIG. 3 is a flowchart of a load building system. In one embodiment, the system may begin by calling a load build simulation routine, described below, that simulates the loading of a shipment into a set of transports (block 301). In one embodiment, the load build simulation routine attempts to build each one of a set of transports to the maximum bound of their valid configuration ranges. The output of the load build simulation routine is analyzed to determine if a complete solution was produced (block 303). In one embodiment, a complete solution may be a solution where a shipment is loaded into a set of transports such that the entire shipment is loaded and each transport has a load in a valid configuration range. If a complete solution has been found then the process ends (block 305).

If a complete solution is not found then the load build simulation routine is called again (block 307). The second call to the load build simulation routine may attempt to load a set of transports to a minimum bound of a valid configuration range. The output of the second call to the load build simulation routine may be analyzed to determine if the number of valid loads generated increased from the first call to the second call (block 311). If the number of valid loads does not increase then the search may be ended and the minimum bound load may be used (block 309). For example, if three valid loads were found in a first call and three valid loads are found in a second call, then the second configuration may be used because the number of valid loads did not increase. If the number of valid loads does increase then a search over the number of loads may be conducted to maximize the number of valid loads that can be created (block 313). In one embodiment, the search may involve the altering of load parameters such as maximum and minimum bounds in order to maximize the number of valid loads that can be found. Various search methods may be used including a binary search to find a configuration that maximizes the number of valid loads by building up to a minimum bound until one or more valid loads are found without leftover demand.

Figure 4:
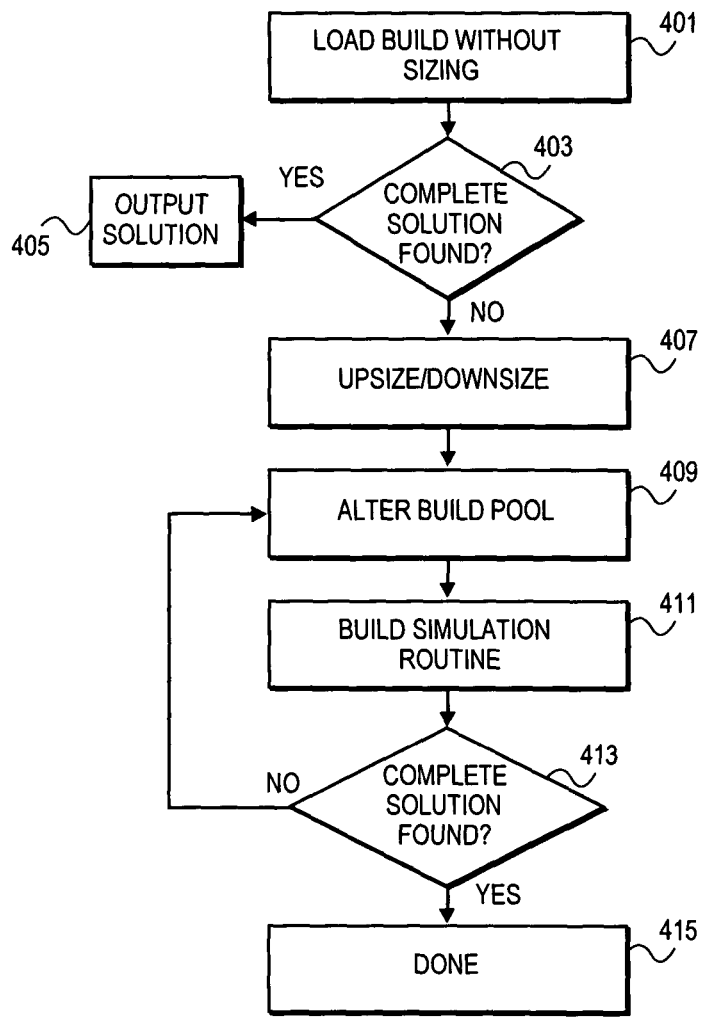
FIG. 4 is a flowchart of a load building system including a sizing function.

FIG. 4 is a flowchart of a load building system that may resize a shipment. In one embodiment, the load building system may initially run the load building system of FIG. 3 (block 401). The output of the load building system without sizing may be analyzed to determine if a complete solution was found (block 403). If a complete solution was found then that solution may be used and output (block 405).

If a complete solution was not found then upsize downsize module 211 may be triggered (block 407). The upsizing of a load draws additional shipping units for demand orders from future time frames into the build pool for the present time frame in order create a full load. A build pool may be a data structure that represents the products according to their quantity to be shipped from a source location to a target location. In one embodiment, the products to be shipped are grouped into shipping units. A shipping unit may be a container, pallet or similar shipping unit. In one embodiment, pallets, containers or similar shipping units may contain a mixture of products to be sent to a target location. This mixed shipping unit may be governed by the shipping rule constraints. For example, a build pool may contain a set of products A, B and C to be shipped to a target location. Twenty-five units of A, twenty five units of B and thirty units of C may constitute the build pool as derived from a demand order. A build pool may be structured in an ordered manner, such that units to be used in a simulated load are drawn from the build pool from a first position iteratively to a last position in the build pool.

In one embodiment, the number of shipping units added to the building pool is calculated to complete a full load of a transport for the final configuration before the upsizing. A downsizing of a load removes shipping units of the demand order from the building pool to conform the number of shipping units to the size of a set of full transports. In one embodiment, the decision to upsize or downsize is based on a threshold capacity analysis of the final load configuration at the point the upsizing downsizing decision may be made. In one embodiment, the threshold value is approximately a fifty percent utilization of the capacity of the final transport in the load configuration. In another embodiment, only one of upsizing or downsizing may be used. After an upsizing or downsizing is made all shipping units may be returned to the build pool and the build pool is altered to include any additional shipping units or to remove any excess shipping units (block 409).

In one embodiment, a single minimum order increment (e.g., a single pallet or container) may be added to a build pool from future demand. This may be done each time a sizing decision is needed until a solution is found. In one embodiment, a set of criteria is used to determine the use of upsizing or downsizing including resulting coverage analysis (e.g., comparing inventory to demand), out of stock products determination and product type (e.g., promotions product or turn product). In one embodiment, the threshold for deciding between upsizing and downsizing may be based on a comparison between two values associated with the costs of shipping or not shipping the remaining shipping units of a set of products. A first value may be a potential sales value that may be a monetary value of profits or similar benefits obtained if a product is shipped. The second value may be potential costs if a sale is lost when a product is not shipped. The threshold may be a mean value of a range of this comparison.

In one embodiment, after the build pool has been reconstructed, the build simulation routine may be run using the altered build pool (block 411). The output of the build simulation routine may be analyzed to determine if a complete solution was found (block 413). If a solution was found then the process may be completed (block 415). If a complete solution was not found then the build pool may be further altered based on the previous decision to upsize or downsize (block 409). This process may continue until a complete solution is found or the process exhausted.

Figure 5:
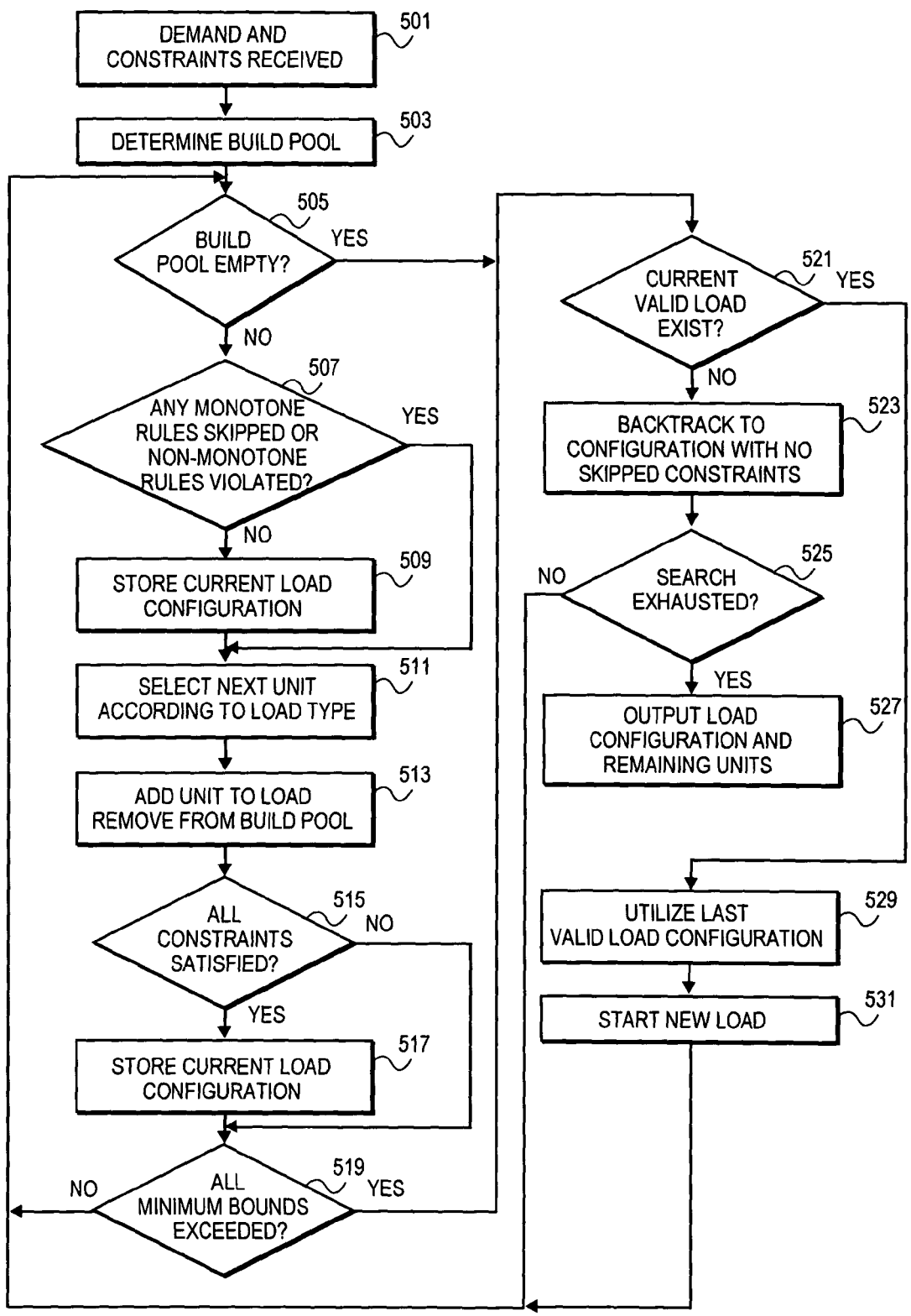
FIG. 5 is a flowchart of build simulation routine of a load building system.

FIG. 5 is a flowchart of a load build simulation routine. In one embodiment, a set of demand orders are received containing a set of products and quantities of product to be shipped to a target location (block 501). The simulation routine may also receive or have access to a set of constraints that are applicable to the shipment. Default shipping constraints may be included and associated with demand that was not satisfied using other sets of shipping constraints during the initial load building of FIG. 3.

The set of demand orders is parsed to determine a build pool (block 503). In one embodiment, the build pool is checked to see if it is empty or all of the shipping units are marked as used (block 505). If the build pool contains shipping units that still need to be loaded, a check is made to determine if any monotone constraints have been skipped or if any non-monotone constraints have been violated for a working load configuration (block 507). A monotone constraint may be a constraint where successive members of a sequence such as the number of shipping units do not cause the constraint to oscillate between being valid and invalid. For example, a shipping weight constraint may be a monotone constraint because adding shipping units always increases the weight of the shipment and if the constraint represented a maximum weight limit, then once that limit was exceeded by adding a shipping unit, adding additional shipping units would not make the constraint valid or satisfied.

If no non-monotone constraints are determined to be violated and no monotone constraints skipped then that configuration is stored for future reference if it is necessary to backtrack to a valid configuration (block 509). If the non-monotone constraints are violated or monotone constraints skipped then the configuration is not stored.

In one embodiment, the build pool may be sorted according to a load type in order to select a shipping unit to be loaded in the simulation (block 511). Load types may include a balanced load type, a straight load type or similar load type. A balanced load may include proportional amounts of the set of products to be shipped. The load may be balanced by the quantity of products to be shipped, the weight of products to be shipped, the quantity of shipping units of a product to be shipped or similar shipping balance considerations. For example, a shipping unit of product A may include 100 items and a shipping unit of product B may include 50 items. A balanced load may include two shipping units of B for every shipping unit of A. A straight load of a transport may load all shipping units of a first product before adding any shipping units of a second product to a transport. Sorting the build pool results in an ordering of the shipping units in the build pool in accordance with the type of load.

For example, if a straight load is desired the build pool may be sorted such that all the shipping units of a first product occupy a set of consecutive slots starting with the first slot in the build pool followed by all shipping units of another product. In another example, if a balanced load is desired the build pool may be sorted such that a proportional amount of all products are ordered in the build pool in an alternating sequence.

In one embodiment, the simulation of the loading of a shipment may be an iterative process. The process of simulating the load of a transport may involve selecting the next shipping unit to be added to the transport (block 511). Shipping units may be added to the transport one at a time or in defined groups of shipping units one group at a time. A shipping unit from the next occupied sorted position of the build pool may be added to the transport (block 513). The constraints applicable to the shipment and transport may then be applied to the configuration of the shipment on the transport and a check may be made to determine if all of the constraints have been satisfied (block 515). If the transport is not yet full (a transport may be considered full if the load configuration exceeds all the minimum bounds of the constraints but does not make all the constraints valid and the load configuration does not exceed any of the maximum bounds), but all the constraints are met then the load configuration may be saved for future reference when backtracking (block 517).

In one embodiment, the constraints checked by the load simulation may include a complex logical statement. The complex logical statement may include value comparisons (e.g., greater than or less than comparison), logical operators (e.g., OR, AND, NOR and similar logical operators), arithmetic operators (e.g., summation, division or similar operation), user defined functions and similar operators. These complex logical statements may be user defined and govern any set or subset of products or transports. For example, a user may define the following logical statement as a constraint:

(Volume between 3730 and 3770 excluding pallets OR weight between 41,500 pounds without pallets and 45,000 pounds with pallets OR number of floor positions between 30 and 30.1) AND volume $\leq$3770 AND weight $\leq$45,000 pounds AND number of floor positions $\leq$30.1.

In this example, for the constraints to be met, this logical expression must evaluate to true. In one embodiment, a system user may define their own logical expressions for constraints using a base set of operators and values. In another embodiment, a user may define new values and operators to use in the logical expressions.

In one embodiment, if the constraints and the demand are not satisfied (block 515) after the loading of a shipping unit, then a check may be made to determine if all the minimum bounds of the constraints have been exceeded (block 519). If minimum bounds have not all been exceeded (block 319), then the process of adding units into the simulated load configuration may continue by checking for unloaded shipping units (block 505).

In one embodiment, if all the minimum bounds have been exceeded (block 519) or if the build pool was empty (block 505) a check may be made to determine if a current valid load exists (e.g., the load that was most recently simulated for a transport was valid) (block 521). A current valid load may not exist if a build pool was empty. If a valid load does exist the routine may utilize the valid load configuration (block 529). A load on a new transport may then be started (block 331). If the last load was not valid then the routine may backtrack to a configuration where no constraints had been skipped (block 523).

In one embodiment, if a valid load was not produced and the routine backtracks, a check may then be made to determine if the search for a valid configuration has been exhausted (block 525). If the search has not been exhausted then the routine may check to determine if the build pool is empty (block 505) before continuing the simulated load. If the search has been exhausted then the load configurations of the set of transports is output including a history of any unloaded shipping units (block 507). An exhausted search may include a load configuration where demand has been satisfied.

In one embodiment, a transport may be loaded for multiple target locations, cross-docking or similar delivery schemes. In these embodiments, the multiple target locations may be grouped geographically, or based on similar criteria. The grouping may then be treated as a single target location and the set of transports destined for these multiple target locations loaded primarily as if they were a single target location. In a further embodiment, an additional constraint on the order of loading a transport may be used to structure the load such that the shipment is grouped by actual target location.

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

What is claimed is:

1. A computer-implemented method comprising:
   receiving a demand order including a set of products to be shipped;
   simulating a loading of a shipment of the set of products into a set of transports;
   evaluating, by a computer system, a shipping rule including a constraint for the shipment during the simulating, the shipping rule permitted to be a complex logical statement;
   attempting to fill each transport in the set of transports in simulating the loading of the shipment; and
   detecting a skipping of a range of the constraint and adjusting the simulating of the loading of the shipment in response to the skipping, wherein the range includes a maximum bound and a minimum bound.

2. The method of claim 1, further comprising:
   simulating one of a balanced load and a straight load of the shipment in the transport.

3. The method of claim 1, wherein the complex logical statement is defined by a user.

4. The method of claim 1, further comprising:
   upsizing the shipment to fill the transport.

5. The method of claim 1, further comprising:
   downsizing the shipment to match a maximum capacity of the transport.

6. The method of claim 1, wherein the shipping rules include at least one constraint including one of a weight constraint, a volume constraint, and a product combination constraint.

7. The method of claim 1, wherein simulating includes incrementing an amount of a first product in the shipment by one shipping unit.

8. The method of claim 7, wherein the shipping unit is a pallet.

9. The method of claim 1, further comprising:
   increasing the amount of the set of products in the shipment a proportionate number of shipping units of each product.

10. The method of claim 1, further comprising:
    attempting to fill at least one transport, the at least one transport having multiple destinations.

11. The method of claim 1, wherein the range of the constraint is skipped when the loading of a shipping unit does not exceed a minimum bound of the constraint and adding another shipping unit exceeds the maximum bound of the constraint.

12. The method of claim 11, wherein adjusting the simulating of the loading of the shipment in response to the skipping comprises:
    removing all shipping units from the simulating of the loading of the shipment after detecting the skipping;
    changing a last shipping unit of the set of products which lead to the skipping with a shipping unit of another set of products; and
    loading the remainder of the shipping units.

13. The method of claim 11, further comprising:
    storing a last load configuration that indicates the loading of a shipping unit that does not exceed the minimum bound of the constraint.

14. The method of claim 13, wherein adjusting the simulating of the loading of the shipment in response to the skipping comprises:
    backtracking the simulating of the loading of the shipment to the last load configuration; and
    changing a last shipping unit of the set of products which lead to the skipping with a shipping unit of another set of products.

15. The method of claim 1, further comprising:
    generating a set of loading configurations.

* * * * *